United States Patent [19]

Kozuka et al.

[11] Patent Number: 4,601,358
[45] Date of Patent: Jul. 22, 1986

[54] POWER STEERING SYSTEM

[75] Inventors: Hajime Kozuka; Hiroshi Yoshida, both of Okazaki, Japan

[73] Assignee: Mitsubishi Jidoshi Kogyo Kabushiki Kaisha, Tokyo, Japan

[21] Appl. No.: 560,991

[22] Filed: Dec. 13, 1983

[30] Foreign Application Priority Data

Dec. 20, 1982 [JP] Japan ................................ 57-222098

[51] Int. Cl.⁴ .............................................. B62D 5/08
[52] U.S. Cl. .................... 180/141; 74/388 PS; 91/372; 91/375 A; 92/136; 137/625.24; 180/143; 180/148
[58] Field of Search ............... 180/141, 142, 143, 149, 180/150, 151, 152, 148; 74/388 PS, 422, 498; 91/375 A, 370, 371, 372, 373; 92/136; 137/625.24

[56] References Cited

U.S. PATENT DOCUMENTS

| | | | |
|---|---|---|---|
| 3,930,554 | 1/1976 | Ward | 91/375 A X |
| 4,009,641 | 3/1977 | Rohde et al. | 91/375 A X |
| 4,331,211 | 5/1982 | Lang | 180/141 |
| 4,377,217 | 3/1983 | Nishikawa et al. | 180/143 |
| 4,460,016 | 7/1984 | Haga et al. | 137/625.24 |

FOREIGN PATENT DOCUMENTS 2146032 2/1973 France.
2448677 2/1979 France.

Primary Examiner—John J. Love
Assistant Examiner—Mitchell J. Hill
Attorney, Agent, or Firm—Wenderoth, Lind & Ponack

[57] ABSTRACT

A power steering system for a vehicle having a power cylinder to which a hydraulic fluid delivered from a pump driven by an engine is supplied through a fluid passage switching valve includes a pressure control valve provided in a branched fluid passage extending from a high pressure fluid passage between the pump and the switching valve to a reaction piston in the switching valve, and having a degree of opening controlled by a pilot pressure, and a pilot pressure control valve provided in a low pressure fluid passage having one end connected through an orifice to the branched fluid passage downstream of the pressure control valve and another end leading to a fluid reservoir.

5 Claims, 9 Drawing Figures

POWER STEERING SYSTEM

BACKGROUND OF THE INVENTION

This invention relates to a power steering system including a power cylinder to which a hydraulic fluid delivered from an oil pump driven by an engine is supplied through a fluid-passage changeover valve.

Known power steering systems have been unsatisfactory in various respects. They fail to satisfy a variety of requirements for performance. They are unsatisfactory due to the failure to provide a light action during the travel of a vehicle at a low speed, the absence of an adequate reaction and the lack of stability for straight movement during the travel at a medium or high speed, the lack of a smooth return during the whole range of the vehicle speed, excessive rotation of a steering wheel in a case of emergency during travel at a high speed, the insufficiency of reliability in operation, the lack of assurance for safety in a case of failure, and the lack of economy of energy consumption.

SUMMARY OF THE INVENTION

It is an object of this invention to provide an improved power steering system which overcomes the drawbacks of the known systems, and satisfies a variety of requirements for performance.

This object is attained by a power steering system comprising an input shaft connected to a steering wheel, a torsion bar provided for transmitting the rotation of the input shaft to an output shaft, a fluid passage changeover valve adapted to switch a fluid flow in accordance with a difference in angle of rotation between the input and output shafts, a power cylinder connected to the output shaft, a high pressure fluid passage by which a hydraulic fluid delivered from an oil pump is supplied to the power cylinder through the fluid passage changeover valve, a first low pressure fluid passage by which the hydraulic fluid is returned from the power cylinder to an oil reservoir through the fluid passage changeover valve, a reaction piston disposed between the input and output shafts for providing a force restricting the difference in angle of rotation between the input and output shafts, a branched fluid passage extending from the high pressure fluid passage to the reaction piston, a pressure control valve provided in the branched fluid passage for controlling the pressure of the hydraulic fluid so that it will not exceed a predetermined maximum level, a second low pressure fluid passage having one end connected by an orifice to the branched fluid passage downstream of the pressure control valve, while the other end thereof is connected to the oil reservoir, a pilot pressure control valve disposed in the second low pressure fluid passage for controlling the pilot pressure downstream of the orifice, and a pilot fluid passage transmitting the pilot pressure to the pressure control valve.

DETAILED DESCRIPTION OF THE INVENTION

Figure 1:
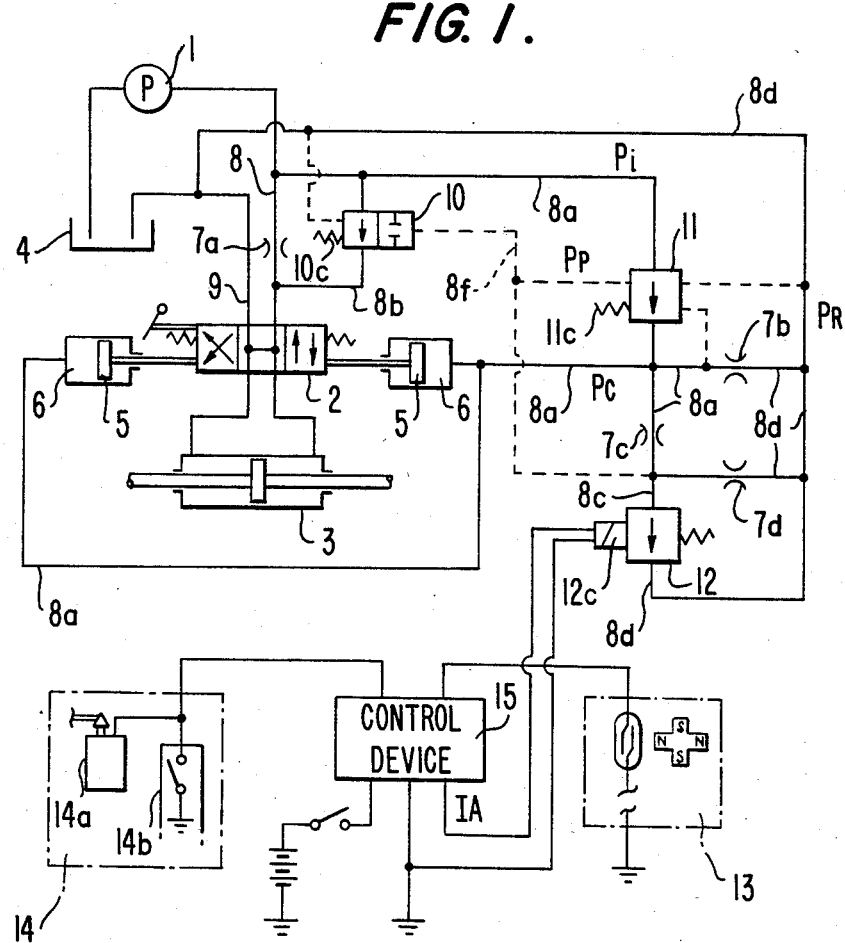
FIG. 1 is a hydraulic circuit diagram showing a power steering system embodying this invention.

A power steering system embodying this invention is diagrammatically shown in FIG. 1. It includes an oil pump 1 adapted to be driven by an engine not shown, a rotary fluid passage changeover valve 2, a power cylinder 3, an oil reservoir 4, a reaction piston means 5 provided around the rotary valve 2, a chamber means 6 defined behind the piston means 5, a high pressure fluid passage 8 extending between the pump 1 and the valve 2, a low pressure fluid passage 9 extending between the rotary valve 2 and the reservoir 4, an orifice 7a provided in the high pressure fluid passage 8, a fluid passage 8a extending from the high pressure fluid passage 8 to the piston chamber 6, a parallel fluid passage 8b extending from the fluid passage 8a to the high pressure fluid passage 8 downstream of the orifice 7a, and a normally open switching valve 10 provided in the by-pass fluid passage 8b.

A pressure control valve 11 is provided in the fluid passage 8a. A fluid passage 8c is connected by an orifice 7c to the fluid passage 8a downstream of the pressure control valve 11. A pilot pressure control valve 12 for the pressure control valve 11 is provided in the fluid passage 8c. A fluid passage 8d extends between the pilot pressure control valve 12 and the low pressure fluid passage 9. The fluid passage 8d is connected to the fluid passage 8c upstream of the pilot pressure control valve 12 through an orifice 7d and the fluid passage 8a downstream of the pressure control valve 11 through an orifice 7b.

The system also includes a vehicle speed sensor 13 having a speed meter, an engine speed sensor 14, an ignition coil 14a, a distributor 14b, and a control device 15. A control signal obtained by calculations is transmitted to a solenoid 12c in the pilot pressure control valve 12 to adjust the degree of opening of the valve 12.

Figure 2:
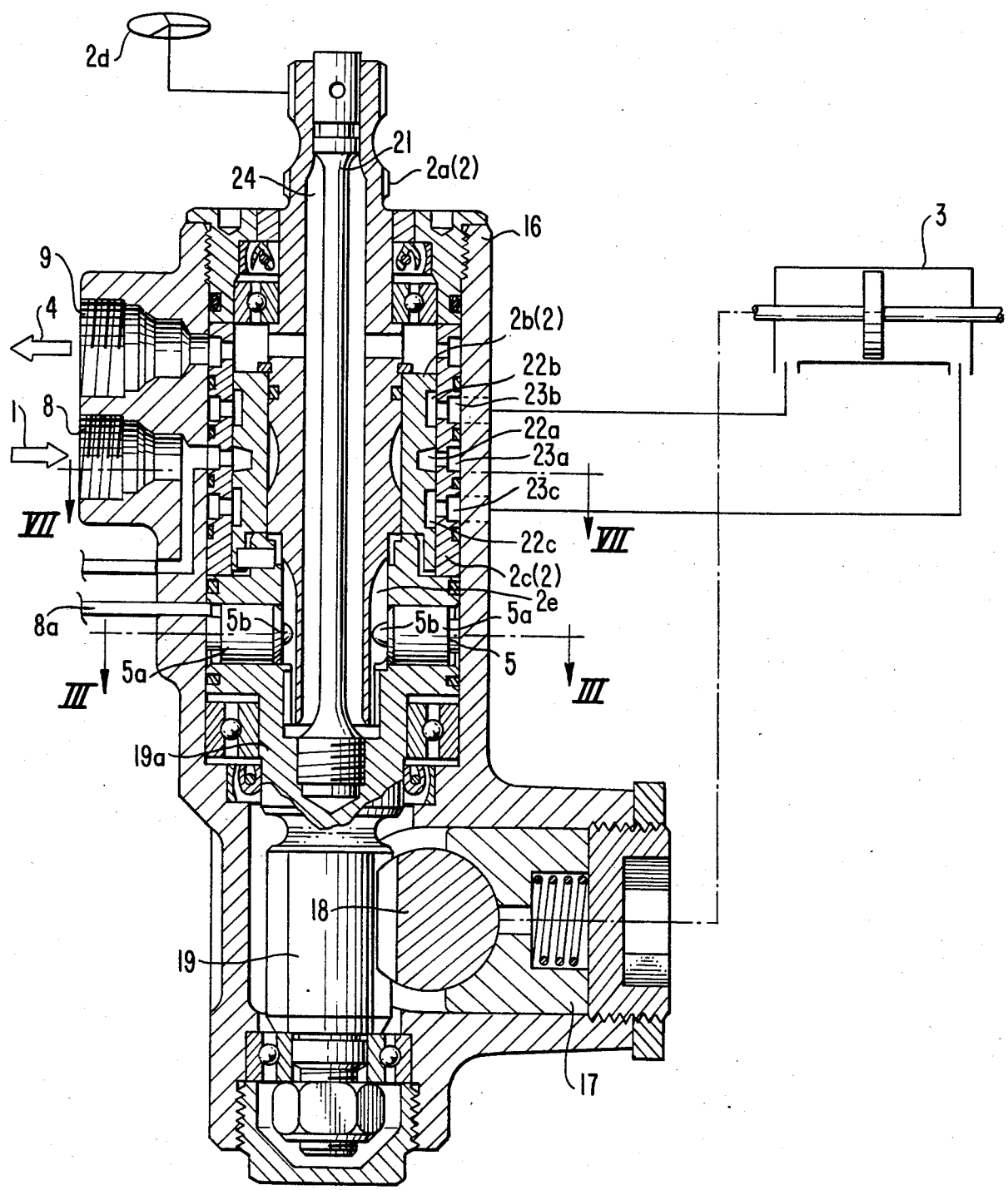
FIG. 2 is a longitudinal sectional view of a fluid passage changeover valve in the system of FIG. 1.
Figure 3:
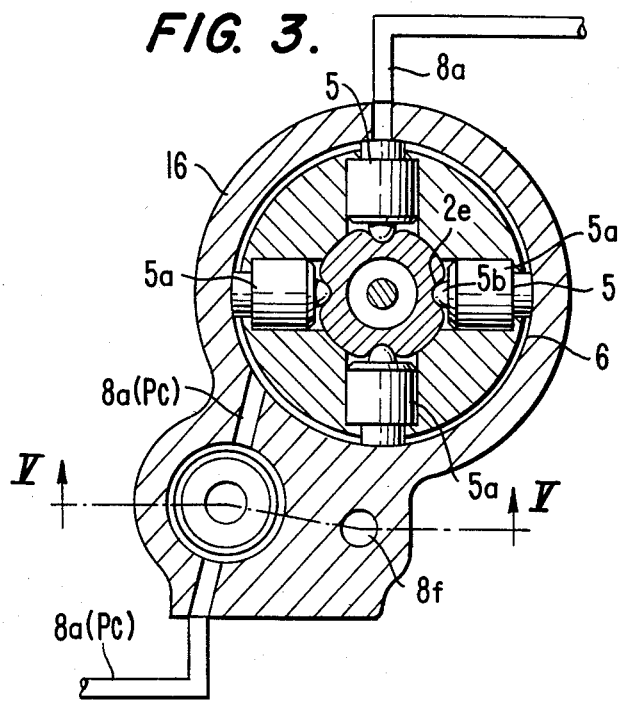
FIG. 3 is a sectional view taken along the line III—III of FIG. 2.

The rotary fluid passage changeover valve 2 is shown by way of example in FIG. 2. It comprises a valve housing 16 having a rack support 17 for a rack 18 engaged with a pinion 19 output shaft 19a, an input shaft 2a and a torsion bar 21 connecting the input shaft 2a and the output shaft 19a. A valve body 2b surrounds the input shaft 2a, and a valve sleeve 2c surrounds the valve body 2b. A hydraulic fluid leaving the oil pump 1 flows through the high pressure fluid passage 8, an annular groove 22a, a fluid passage 23a, a chamber 24, the low pressure fluid passage 9, the reservoir 4, and returns to the pump 1. If a steering wheel 2d, shown schematically in FIG. 2 is turned to the right to rotate the input shaft 2a to the right, the high pressure fluid passage 8 is connected to the fluid passage 23b in the valve sleeve 2c through a fluid passage in the input shaft 2a, and the hydraulic fluid is supplied from the oil pump 1 to one of the chambers in the power cylinder 3, the piston of which is connected to rack bar 18, through the high pressure fluid passage 8, the annular groove 22a and the fluid passage 23b to move the piston of power cylinder 3 to the right in FIG. 2, while the power hydraulic fluid in the other chamber of the cylinder 3 returns to the reservoir 4 through a fluid passage 23c, the chamber 24 and the low pressure fluid passage 9. If, on the contrary, the handle steering wheel is turned to the left to rotate the input shaft 2a to the left, the high pressure fluid passage 8 is connected to the fluid passage 23c in the valve sleeve 2c through the fluid passage in the input shaft 2a, the hydraulic fluid is supplied from the oil pump 1 to the other chamber in the power cylinder 3 through the high pressure fluid passage 8, the annular groove 22a and the fluid passage 23c to move the piston of the power cylinder 3 to the left, while the hydraulic fluid in the one chamber of the power cylinder 3 returns to the reservoir 4 through the fluid passage 23b, the chamber 24 and the low pressure fluid passage 9.

Figure 4:
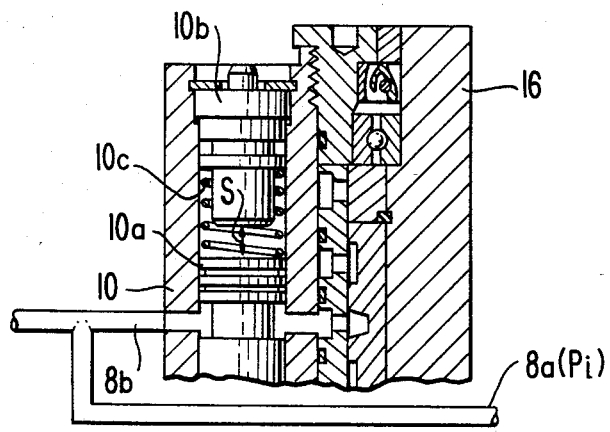
FIG. 4 is a longitudinal sectional view taken along the line IV—IV of FIG. 5 and showing a switching valve.
Figure 5:
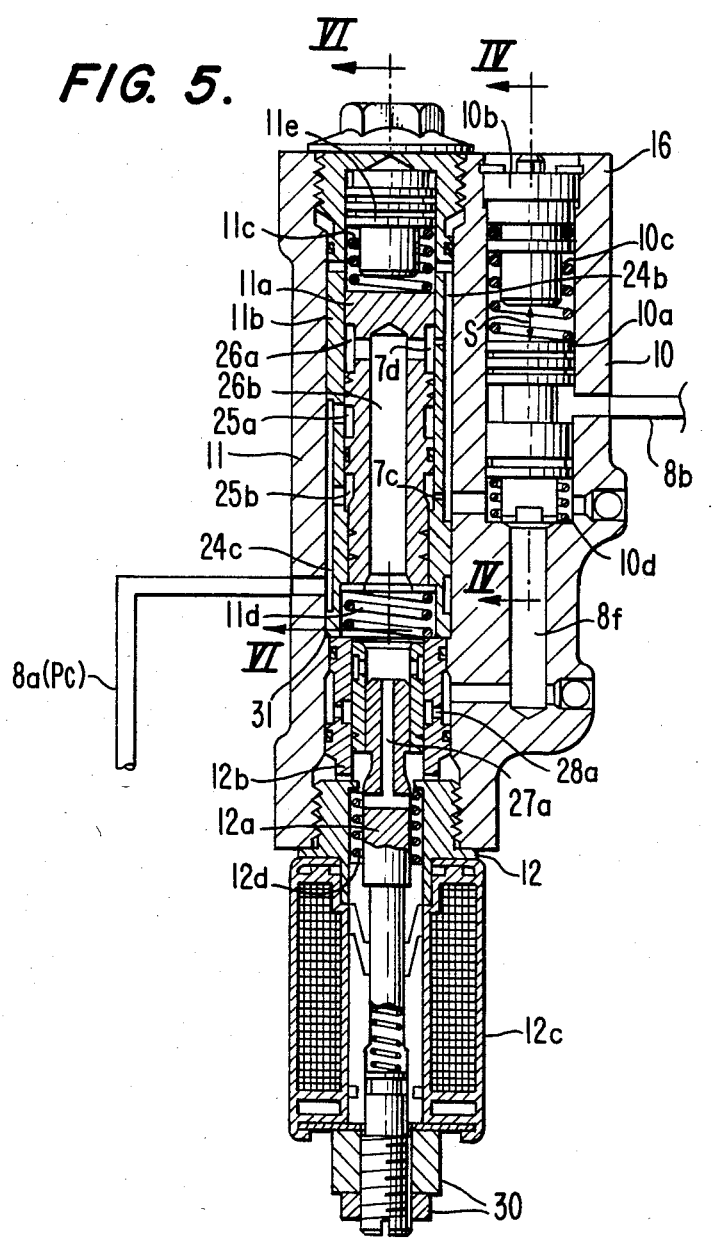
FIG. 5 is a longitudinal sectional view taken along the line V—V of FIG. 3 and showing the switching valve, a pressure control valve and a pilot pressure control valve.

The switching valve 10 is shown by way of example in FIGS. 4 and 5. It comprises a valve body 10a, a stop member 10b secured to the valve housing 16, and a compression spring 10c disposed between the valve body 10a and the stop member 10c. The spring 10c urges the valve body 10a to maintain the parallel fluid passage 8b normally open. The valve body 10a is movable over a stroke which is indicated at S.

Figure 6:
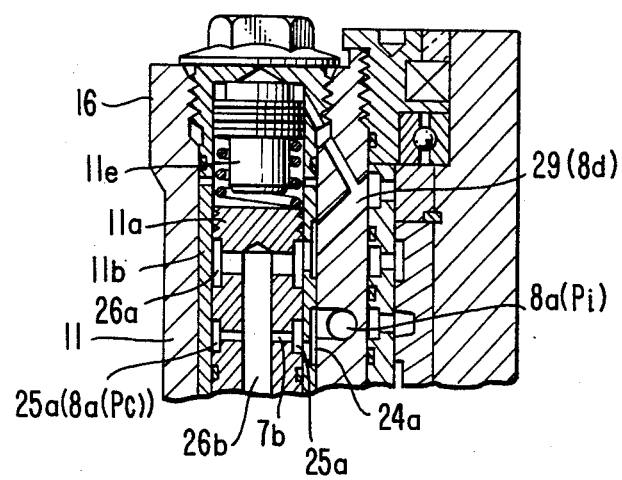
FIG. 6 is a longitudinal sectional view taken along the line VI—VI of FIG. 5 and showing the pressure control valve.
Figure 7:
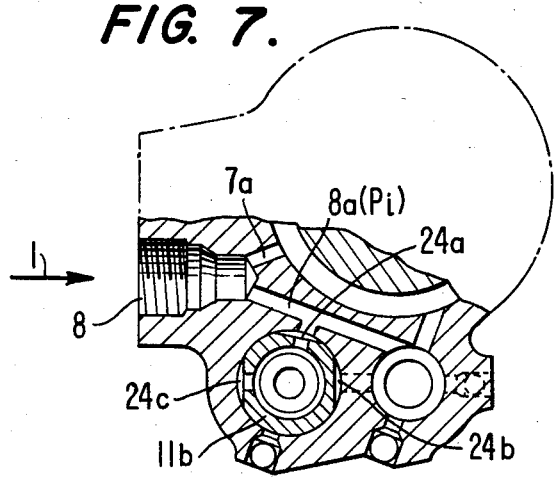
FIG. 7 is a sectional view taken along the line VII—VII of FIG. 2.

The pressure control valve 11 is shown by way of example in FIGS. 5 and 6. It is disposed between a fluid passage 8a(Pi) (FIG. 6), which is a passage on the Pi side in FIG. 1, and a fluid passage 8a(Pc) (FIG. 5), which is a passage on the Pc side in FIG. 1, to control the degree of opening therebetween to control the flow of fluid to the reaction piston means 5 comprised of a plurality of reaction pistons 5a spaced around shaft 2a and having projections 5b thereon engaging in grooves 2e in shaft 2a. The valve 11 comprises a valve body 11a, a valve sleeve 11b, a stop member 11e secured to the valve housing 16, a compression spring 11c disposed between the valve body 11a and the stop member 11e, and a compression spring 11d disposed between the valve body 11a and a valve sleeve 12b in the pilot pressure control valve 12. The valve sleeve 11b is provided on its outer peripheral surface with a fluid passage 24a connected to the fluid passage 8a (Pi) as shown in FIGS. 6 and 7, a fluid passage 24b (FIGS. 5 and 7), which forms a part of a pilot fluid passage 8f which is shown in FIG. 1, and a fluid passage 24c (FIGS. 5 and 7) connected to the fluid passage 8a(Pc). The valve body 11a is provided on its outer periphery with a fluid passage 25a connected to the fluid passage 24a and a fluid passage 25b connected to the fluid passage 25a by the fluid passage 24c. The fluid passage 25b is connected by the orifice 7c and the pilot fluid passage 8f (or fluid passage 24b) to that side of the valve 11 in which the compression spring 11c is disposed, and that side of the switching valve 10 in which a counter compression spring 10d is disposed, as shown in FIGS. 1 and 5. The valve body 11a is also provided with an outer peripheral fluid passage 26a and an axially extending fluid passage 26b having an upper end connected to the fluid passage 26a and a lower end opening toward the pilot pressure control valve 12. The fluid passage 26a is connected by the orifice 7d to the pilot fluid passage 8f (or fluid passage 24b), as shown in FIGS. 1 and 5. The fluid passage 25a on the outer periphery of the valve body 11a is connected to the fluid passage 26b by the orifice 7b as shown in FIGS. 1 and 6.

The pilot pressure control valve 12 is shown by way of example in FIG. 5. It comprises a valve body 12a movable against solenoid spring 12d, a valve sleeve 12b and a solenoid 12c adapted to move the valve body 12a. An inverted T-shaped fluid passage 27a is provided in the valve body 12a. A fluid passage 28a is provided in the valve sleeve 12b, and connected to the pilot fluid passage 8f (or 8c in FIG. 1). The fluid passage 27a is connected to the low pressure fluid passage 9 (return fluid pressure $P_R$) through the fluid passages 26b and 26a and a fluid passage 29 in FIG. 6. FIG. 5 also shows a nut 30.

Figure 8:
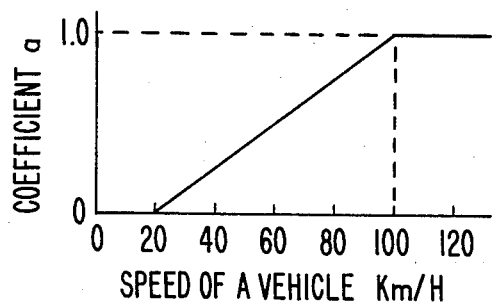
FIG. 8 is a graph showing the relationship between the speed of a vehicle and a coefficient.
Figure 9:
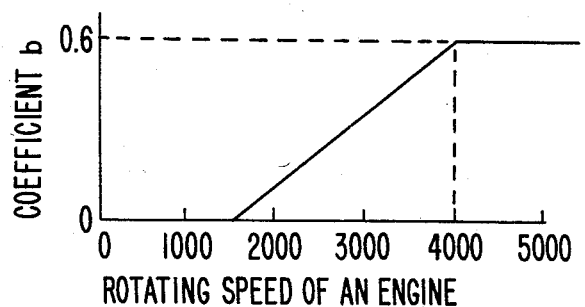
FIG. 9 is a graph showing a relationship between the rotating speed of an engine and a coefficient.

Referring now to the operation of the power steering system as hereinabove described, the oil pump 1 driven by the engine has an output which varies in accordance with the rotating speed of the engine. The output of the pump shows a sharp increase during the start of the vehicle and its travel at a low speed and a sharp reduction during its travel at a medium speed, while it is maintained at a constant low level during the travel of the vehicle at a high speed. The oil pump is disclosed in detail in Japanese Utility Model Application No. 4939/1982. When the output of the oil pump 1 shows a sharp increase, the fluid passage changeover valve 10 in the bypass fluid passage 8b is in its open position. Almost all the quantity of the hydraulic fluid delivered from the pump 1 is supplied to the power cylinder 3 through the rotary changeover valve 2, and substantially no hydraulic pressure develops in the branched fluid passage 8a. As no fluid pressure is fed to the reaction piston means 5, no steering reaction is produced, but a light steering action is obtained. The control device 15 receives an output signal from the vehicle speed sensor 13 and an output signal from the engine speed sensor 14. It performs calculations of the following formula based principally on the output of the vehicle speed sensor, but also taking the output of the engine speed sensor into account:

$$I = [1.0 - (a + b)] \times 0.6 + c$$

in which a and b make a total not exceeding 1.0, a is a coefficient corresponding to the speed of the vehicle as shown in FIG. 8 and representing the amount of change in electric current, b is also a coefficient representing the engine speed as shown in FIG. 9 and representing the amount of change in electric current, and c represents an electric current sufficient to overcome spring 12d, friction, etc., but which does not cause any displacement of the solenoid 12c. The control device 15, thus, generates a pilot pressure control signal $I_A$ and transmits it to the solenoid 12c in the pilot pressure control valve 12. In accordance with an increase in the outputs of the vehicle speed sensor 13 and the engine speed sensor 14, the control device 15 controls the pilot pressure control valve 12 so as to close it, and a gradual increase appears in the pilot pressure $P_p$ upstream of the valve 12. The control pressure $P_c$ downstream of the pressure control valve 11 is fed to the fluid passage 25b, and the valve 11 cooperates with the compression spring 11c to maintain the control pressure $P_c$ at a level not exceeding a predetermined maximum value. If the pilot pressure $P_p$ is fed to the compression spring 11c, however, the valve 11 is opened to increase the control pressure $P_c$, and a gradual increase in steering reaction is thereby obtained. When the vehicle travels at a high speed, the pilot pressure $P_p$ increases to close the fluid passage switching valve 10 to increase the pressure $P_i$ upstream of the pressure control valve 11. Accordingly, the pressure $P_c$ downstream of the valve 11 increases, and acts on the reaction piston means 5 to increase the steering reaction, even if the hydraulic fluid is supplied to the power cylinder 3 at substantially zero pressure when the steering wheel is kept in the vicinity of its neutral position during the travel of the vehicle at a high speed.

The system as hereinabove described also has the advantage that the pressure control valve 11 and the pilot pressure control valve 12 can be assembled together accurately as shown in FIG. 5. They can be assembled together as will hereinafter be described.

(I) The valve sleeve 11b of the pressure control valve 11 containing the valve body 11a therein is inserted into the valve housing 16 until it rests on a shoulder 31 in the valve housing 16.

(II) The compression spring 11d is inserted into the sleeve 11b through the opposite end thereof.

(III) The valve sleeve 12b of the pilot pressure control valve 12 is inserted into the valve housing 16 through the opposite end thereof until it contacts the valve sleeve 11b.

(IV) The solenoid 12c containing the valve body 12a is inserted until it contacts the sleeve 12b.

The two valves 11 and 12 can, thus, be accurately placed in position by insertion through the opposite ends of the valve housing 16 so that they may meet each other at the shoulder 31.

Although the invention has been described with reference to a preferred embodiment thereof, it is to be understood that variations or modifications may be easily made by anybody of ordinary skill in the art without departing from the scope of this invention which is defined by the appended claims. For example, it is possible to modify the control device 15 so that it may work in response to the output of a device for sensing the angular speed of the steering wheel.

What is claimed is:

1. A power steering system comprising:
   an input shaft;
   a steering wheel connected to said input shaft;
   a torsion bar connected to said input shaft for transmitting the rotation of said input shaft;
   an output shaft connected to said torsion bar to which the rotation of said input shaft is transmitted;
   a fluid passage changeover valve connected to said input shaft for switching fluid flow between fluid flow passages in accordance with the difference between the angle of rotation of said input and output shafts;
   rack and pinion means driven by said output shaft;
   a power cylinder having a piston connected to said rack;
   an oil pump;
   a high pressure fluid passage connected between said oil pump and said power cylinder and having said changeover valve connected therein for delivering hydraulic fluid from said oil pump to said power cylinder;
   an oil reservoir;
   a first low pressure fluid passage connected between said power cylinder and said reservoir and in which said changeover valve is connected for returning hydraulic fluid from said power cylinder to said reservoir;
   a reaction piston means engaging one of said input and output shafts for producing a force on the thus engaged shaft for restricting said difference in angle of rotation between said shafts;
   a branch fluid passage extending from said high pressure fluid passage to said reaction piston means;
   a pressure control valve in said branch fluid passage for maintaining the hydraulic pressure in said branch fluid passage at a level not exceeding a predetermined maximum pressure;
   a second low pressure fluid passage having one end connected to said branch fluid passage downstream of said pressure control valve and having an orifice therein, the other end of said second low pressure fluid passage being connected to said reservoir;
   a pilot pressure control valve in said second low pressure fluid passage downstream of said orifice for controlling a pilot pressure; and
   a pilot fluid passage connected between said second low pressure fluid passage and said pressure control valve for transmitting said pilot pressure to said pressure control valve.

2. A system as claimed in claim 1 further including an orifice in said high pressure fluid passage, a bypass fluid passage connected around said orifice, and a switching valve in said bypass fluid passage and connected to said pilot fluid passage for being operated in response to the pilot pressure.

3. A system as claimed in claim 1 further including a sensor means for detecting the operating condition of the vehicle in which said system is installed, and a control device connected to said sensor means for calculating a pilot pressure in accordance with the output of said sensor means and connected to said pilot pressure control valve to transmit a pilot pressure control signal thereto.

4. A system as claimed in claim 3 in which said sensor means includes at least two sensors for detecting the operating conditions of the vehicle simultaneously, and said control device comprises means for calculating the pilot pressure principally in accordance with the output of one of said sensors while also taking the output of the other sensor into account.

5. A system as claimed in claim 4 in which said one sensor is a vehicle speed sensor and the other sensor is a vehicle engine speed sensor.

* * * * *